(12) United States Patent
Aydin et al.

(10) Patent No.: US 9,443,452 B2
(45) Date of Patent: Sep. 13, 2016

(54) PROVIDING INFORMATION USING AN OPTICAL ELEMENT

(71) Applicant: Ortana Elektronik Yazilim Taah. San. ve Tic. A.S., Ankara (TR)

(72) Inventors: Umut Aydin, Ankara (TR); Birhan Uguz, Ankara (TR)

(73) Assignee: ORTANA ELEKTRONIK YAZILIM TAAH. SAN. VE TIC. A.S., Ostim Yenimahalle-Ankara (TR)

( * ) Notice: Subject to any disclaimer, the term of this patent is extended or adjusted under 35 U.S.C. 154(b) by 0 days.

(21) Appl. No.: 14/509,147

(22) Filed: Oct. 8, 2014

(65) Prior Publication Data
US 2015/0103531 A1    Apr. 16, 2015

(30) Foreign Application Priority Data
Oct. 10, 2013    (EP) .................................... 13188106

(51) Int. Cl.
| | | |
|---|---|---|
| G09F 13/14 | (2006.01) |
| G09F 9/33 | (2006.01) |
| F21V 23/00 | (2015.01) |
| G02B 5/00 | (2006.01) |
| G09F 13/04 | (2006.01) |

(52) U.S. Cl.
CPC ............ *G09F 13/14* (2013.01); *F21V 23/005* (2013.01); *G02B 5/003* (2013.01); *G09F 9/33* (2013.01); *G09F 2013/0472* (2013.01)

(58) Field of Classification Search
CPC .. G09F 9/33; G09F 13/14; G09F 2013/0472; G09F 2013/0472; G02B 5/003; F21V 23/005
See application file for complete search history.

(56) References Cited

U.S. PATENT DOCUMENTS 6,249,375 B1 *    6/2001    Silhengst .............. B61L 5/1836
                                                                116/63 R

FOREIGN PATENT DOCUMENTS

| EP | 0453932 A2 | 10/1991 |
|---|---|---|
| EP | 0930600 A1 | 7/1999 |
| EP | 1643473 A1 | 4/2006 |
| EP | 1696171 A1 | 8/2006 |
| TR | 200200366 A2 | 9/2003 |
| TR | 200200582 A2 | 10/2003 |
| TR | 200300850 A2 | 1/2005 |
| TR | 200300981 A2 | 1/2005 |
| WO | 03067933 A1 | 8/2003 |
| WO | 2004109620 A1 | 12/2004 |

OTHER PUBLICATIONS

European Search Report, EP13188106, Feb. 18, 2014, 5 pages.

* cited by examiner

*Primary Examiner* — Thomas M Sember
(74) *Attorney, Agent, or Firm* — Edell, Shapiro & Finnan, LLC

(57) ABSTRACT

An information system for displaying information, the system including a light source 2, an optical element OP having an optical axis to display information by directing light received at an entrance surface 5 from the light source through the optical element to an exit surface 6 for the light to exit the optical element, and, an absorber 10 to absorb sunlight entering the optical element at the exit surface. The system includes a reflector 12, 13 to reflect sunlight entering the optical element at the exit surface to the absorber 10 to absorb the reflected sunlight.

22 Claims, 4 Drawing Sheets

PROVIDING INFORMATION USING AN OPTICAL ELEMENT

FIELD OF THE INVENTION

The invention relates to an information system for displaying (traffic) information, the system comprising:
a light source;
an optical element comprising an optical axis to display information by directing light received at an entrance surface from the light source through the optical element to an exit surface for the light to exit the optical element; and,
an absorber to absorb sunlight entering the optical element at the exit surface.

BACKGROUND

Information systems enable information to be provided to recipients. For example drivers and road users may be warned against varying road conditions. The information such as the instantaneous speed limits, weather information, lane condition information, road dynamics and tunnel information, etc. may be provided via the system. With the advance of light technology, light emitting diodes (LED) have been widely used as the light source. With today's technology, the LEDs provide the light intensity of the conventional light sources by consuming much less energy. In addition, their small size, longer lifetime and inexpensiveness have enabled them to become preferred over the conventional light bulbs. As a result, the LED technology is preferred in order to enhance the optical performance and render images with smaller pixels in the information systems.

The information systems generally comprise an electronic circuit board on which the light source is mounted, the absorber front surface and the optical element, which enables the light source to attain the desired optical standards. The information systems have certain standards based on their radiation intensity, angle, colour and contrast ratio. These standards determine the range of visibility in which the system may be displayed and the quality of the vision.

Although it is possible to directly employ the LED in information systems, it is appropriate to use an optical element with protective and optical features in order to enable the LED being used to be less affected by the ambient conditions and to achieve the desired angle, colour, radiation and contrast values. In order to increase the contrast, it is necessary to reduce the back reflection of the sunlight with angles of incidence which are specified in standards. The information systems may suffer from back reflection of sun beams in the information system.

FIG. 1 depicts a side view of the information system according to the prior art. The information system comprises:
a light source 2 on an electronic circuit board 1;
an optical element OP comprising an optical axis to display information by directing light received at an entrance surface 5 from the light source 2 through the optical element OP to an exit surface 6 for the light to exit the optical element OP. The system is provided with a front surface 3 in which the optical element OP may be mounted.

EP0930600 discloses that the sunlight guided from the front surface of the lens may be absorbed by features in the optical element or the holder of the optical element.

EP1593109 discloses a sheet with a greater refractive index surrounding the lens whereby the sunlight beams guided onto the bottom surface of the lens are absorbed on the sheet surface due to the difference in the refractive indices.

Moreover, the position of the light source along with the lens must be precisely adjusted in three dimensions. According to patent no. EP1593109, the light sources are fastened to the surface of the lenses positioned on the front surface. Owing to this method, the light source is enabled to be precisely positioned in the lens in 3 dimensions. However, the need to separately screw each lens according to this method is both costly and slows down the production process.

EP1643473 discloses a bevelled lens portion in the optical element to direct the sunlight from the sun to a projection acting as an absorption screen in the optical element.

Changes made in the optical element to absorb reflections of sun beams however may disturb the desired radiation intensity, colour, or illumination angle that is provided by the information system. The optical element may have low illumination efficiency caused by the features for absorbance in the optical element.

SUMMARY OF EXAMPLE EMBODIMENTS

It is an objective to provide an improved information system.

Accordingly there is provided an information system for displaying information, the system comprising:
a light source;
an optical element comprising an optical axis to display information by directing light received at an entrance surface from the light source through the optical element to an exit surface for the light to exit the optical element; and,
an absorber to absorb sunlight entering the optical element at the exit surface, wherein the system comprises a reflector to reflect sunlight entering the optical element at the exit surface to the absorber to absorb the reflected sunlight.

By reflecting sunlight to the absorber with a reflector the angle of the sunlight may be largely adjusted so that there is a smaller chance of reflections towards the exit surface of the optical element. Since the absorber is outside the optical element there is no absorption of the light entering the optical element on its way to the exit surface. No absorber materials are present in the optical element improving its illumination efficiency.

According to an embodiment the reflector may be constructed to reflect sunlight under an angle, within a range of 20 to 70, preferably 30 to 60 and most preferably 40 to 55 degrees with respect to the optical axis of the optical element to the absorber. The reflector thereby assures that the sunlight is directed under a relatively large angle away from the optical element such that the chance that it will reflect back into the optical element is minimized.

According to an embodiment the reflector may be an internal reflector in the optical element to direct the sunlight out of the optical element through a side surface of the optical element. An internal reflector allows for a relatively easy construction of the optical element which may be moulded in one go.

According to a further embodiment the reflector comprises a repetitive reflector distributed over at least a part of the side surface of the optical element and in which the sunlight entering through the lens exit surface reflects on the repetitive reflector to the absorber. The repetitive reflector comprises multiple reflectors positioned behind each other so as to assure that the light is reflected over a long range by the multiple reflectors.

According to a further embodiment of the information system the reflector comprises a reflective surface having an proper angle for total reflection within a range of 20 to 70, preferably 30 to 60, and most preferably 40 to 55 degrees with respect to the optical axis of the optical element to reflect the sunlight to the absorber. The reflector thereby assures that the sunlight is directed under a relatively large angle away from the optical element such that the chance that it will reflect back into the optical element is minimized.

According to an embodiment the absorber is provided at a distance from the reflector. There may be no contact between the optical element and the absorber. The distance may be larger than 0. The absorber is at a distance and therefore the absorber may not influence the internal reflections inside the optical element. The distance may be between 0.1 to 50 mm, preferably between 0.2 to 10 mm and most preferably between 0.5 to 2.5 mm. Especially, because the absorber may be located at a distance from the reflector there is less chance of reflections of the sunlight back towards the exit surface.

According to an embodiment the exit surface of the optical element may comprise a geometric structure which may reduce within a desired angle range the back reflection of the sun light. In this way direct reflections on the exit surface may be circumvented.

According to an embodiment the exit surface of the optical element comprises a geometric shape which does not reflect any incoming sunlight in a direction with an inclination range of preferably −15 to 10 degrees with respect to the optical axis.

According to an embodiment the exit surface of the optical element has a tilted upper portion which in use is to shade a relatively lower portion of the exit surface from snow and/or dust. The lower portion may thereby be kept clean.

According to an embodiment the reflector may be provided to a lower portion of the optical element. The sunlight may be projected in a lower portion of the optical element because the sunlight may reach the optical element from a direction above the horizon.

According to an embodiment the system comprises:
a front member with holes for accommodating the optical element;
a light source mounted on a circuit board and the system comprises a spacer for keeping the circuit board and the front member at a fixed distance. The electronic circuit board may be screwed with a screw to the spacer. The system is thereby more easily assembled.

According to an embodiment the absorber comprises one or more of the following features: a dark colour paint; and an absorbing structure. The light will be absorbed better with the above mentioned features. The electronic circuit board may be screwed with a screw to the spacer.

According to an embodiment the reflector may comprise a single reflector adjacent to the entrance surface of the optical element. With a single reflector the design is more easily produced than with multiple reflecting structures.

According to a further embodiment there is provided a method for displaying information comprising:
providing light from a light source:
directing light received from the light source at an entrance surface of an optical element through the optical element to an exit surface for the light to exit the optical element, and,
reflecting sunlight entering the optical element at the exit surface to an absorber.

DETAILED DESCRIPTION

Figure 1:
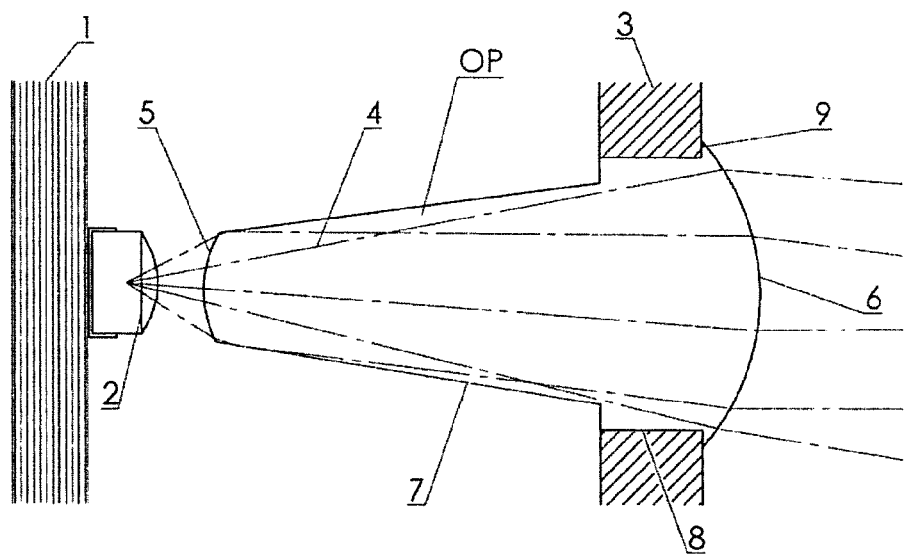
FIG. 1 depicts a side view of the optical element according to the prior art.
Figure 2:
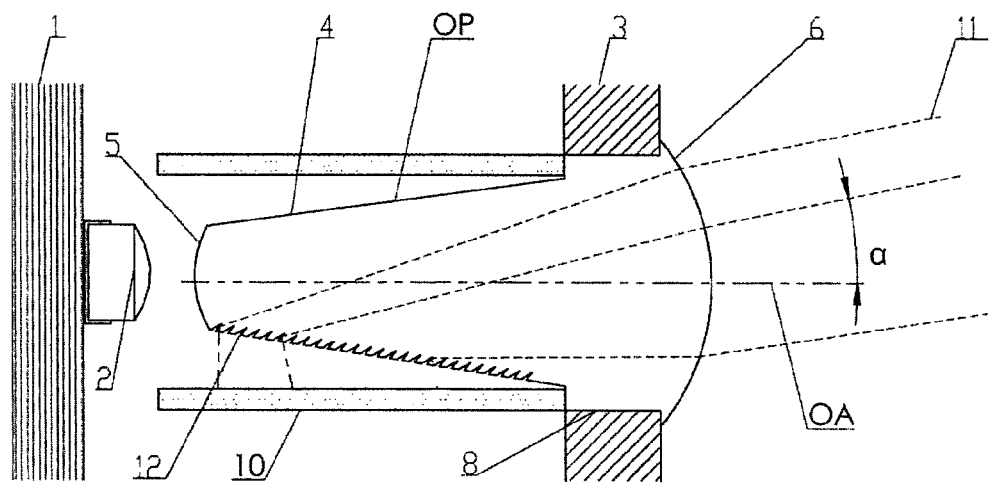
FIG. 2 depicts a side view of the optical element according to an embodiment.

Information systems may generally comprise an electronic circuit board whereon a light source (e.g. light emitting diode) may be mounted. The optical element enables the light to attain the desired optical standards. FIG. 2 depicts a side view of the optical element according to an embodiment of the invention. The information system for displaying information comprises:
a light source 2;
an optical element OP comprising an optical axis OA to display information by directing light received at an entrance surface 5 from the light source through the optical element to an exit surface 6 for the light to exit the optical element, and,
an absorber 10 e.g. an absorber sheet to absorb sunlight 11 entering the optical element at the exit surface 6.

The system comprises a reflector 12 to reflect sunlight entering the optical element from the exit surface to the absorber sheet 10 to absorb the reflected sunlight.

The reflector may be a repetitive reflector 12 distributed over the side surface 7 of the optical element OP to reflect the sunlight in the direction of the absorber sheet 10. In this way the reflector may be distributed over a long range and thereby the sunlight may be reflected away over a long range.

The geometric structure of the optical element OP e.g. lens is designed to gather and guide the light beams emitted from the light source 2. The entrance surface 5, (which optionally meets the light source) enables as much light as possible to enter the optical element and the radiation intensity to be adjusted in association with the size of the exit surface 6. The side surfaces 4 may enable the light to be conveyed and guided from the entrance surface 5 to the exit surface 6. The exit surface 6 enables the light guided within the optical element to be directed according to desired angle and intensity. These three surfaces may be provided with the proper dimensions by means of optimization performed via an optical design program in order to enable the desired optical values. The guidance of the light beams within the optical element occurs based on the law of total reflection.

The reflector 12 may reflect sunlight 11 entering at certain angles α through the lens exit surface 6 that has its centre of curvature on a main optical axis OA of the optical element to exit substantially perpendicular to the main optical axis OA through the side surface 4. The reflector 12 may be constructed to reflect sunlight under an angle, within a range of 20 to 70, preferably 30 to 60 and most preferably 40 to 55 degrees with respect to the optical axis of the optical element to the absorber 10. The reflections may be caused by internal reflections in the optical element. The reflector may comprise a repetitive reflector 12 distributed over the lower side surface 7 and in which the sunlight 11 entering through the lens exit surface 6 reflects internally on the repetitive reflector through the side surface 4. The reflector may have a reflective surface having an angle within a range of 20 to 70, preferably 30 to 60, and most preferably 40 to 55 degrees with respect to the optical axis of the optical element to reflect the sunlight to the absorber.

When light beams are passing from an environment with a greater refractive index into an environment with a smaller refractive index, they perform total reflection and remain within the environment with the greater refractive index in case their angle of incidence is above a certain value. All the geometries on the optical element are designed based on the angles with which the light may perform total reflection within the optical element. The position of the light source with respect to the optical element determines the angle by which the light beams enter the optical element and their amount. For the multi-colour light sources, the position of the source directly affects the colour mixture able to be guided within the optical element.

The symmetry of the optical element exit surface 6 with respect to the optical axis may be varied by changing the form of the optical element and or the dimensions of the extensions 9 that enable the optical element to fasten on the front surface. In this way, the light beams are enabled to be tilted.

The length of the optical element body influences the angle by which the light will spread. An accurately adjusted long body may allow an optical element with an acute angle to be obtained. Vice versa, a short body enables an optical element with an obtuse angle to be obtained. The size of the body must be supported with the geometric structures of the optical element entrance and exit surfaces.

Figure 3:
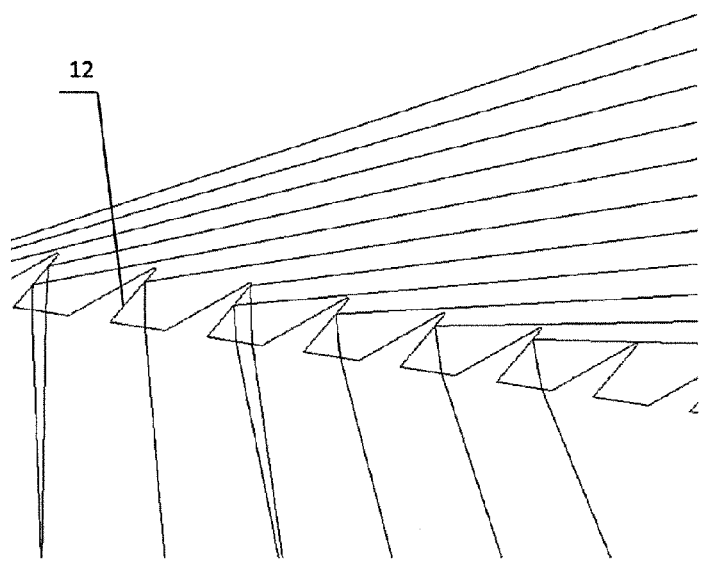
FIG. 3 depicts guiding of the light by the repetitive reflector distributed over the side surface.

As shown in FIGS. 2 and 3 the reflectors 12 are added to the optical element OP for reflecting the sun beams 11 to the absorber 10. The beams reflected from the optical element exit surface 6 to the optical element bottom surface 7 are reflected by the reflector 12 towards the absorber which may (partially) surround the optical element. As can be seen in FIG. 2, the sun beams that are incident on the optical element exit surface 6 at an angle of a with respect to the optical axis OA are guided to the bottom surface 7 due to the refractive index of the optical element and reflected by the reflectors 12 towards the absorber 10 surrounding the optical element, by way of total reflection owing to the difference in the refractive indices. The number of reflectors may be reduced in order to use the optical element surface more effectively.

As can be seen in FIG. 3, the reflectors may be designed taking into account the refractive indices of the optical element and the air and the angle of incidence of the sun beams and the sun beams must be enabled to perform total reflection from the surface.

Figure 4:
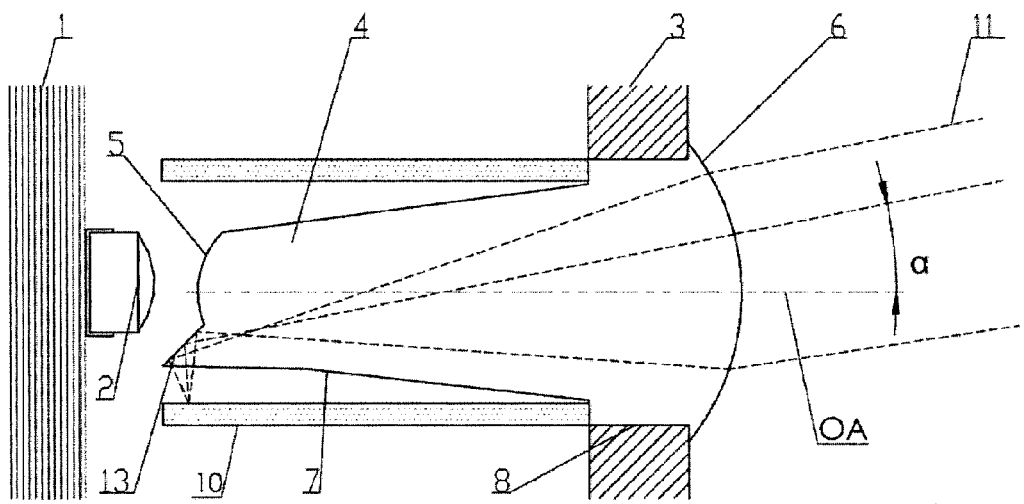
FIG. 4 depicts a side view of the optical element according to a further embodiment.

As can be seen in FIG. 4, it is possible to design a single reflector near the entrance surface 5 of the optical element. All the guided sun beams are reflected through the bottom surface 7 by way of total reflection also resulting from the difference in the refractive indices at a single reflector 13 attached to the optical element entrance surface 5.

Figure 5:
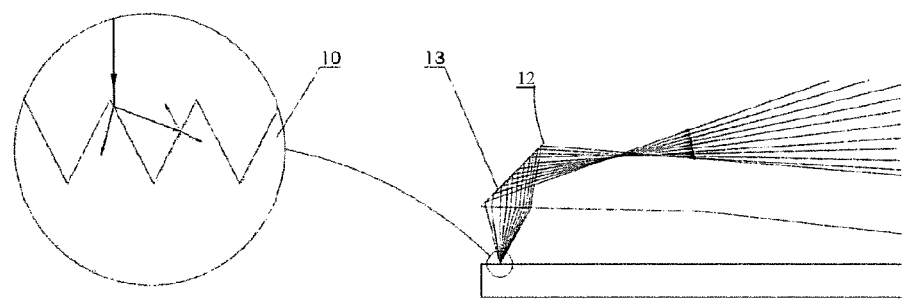
FIG. 5 depicts reflection of sunlight by the single reflector adjacent to the entrance surface.

As can be seen in FIG. 5, the reflector 13 may be designed taking into account the refractive indices of the optical element and the air and the angle of incidence of the sunlight and the sunlight must be enabled to perform total reflection from the surface. By having a single reflector 13 near the optical element entrance surface 5 (see FIG. 4), the reflector doesn't need to be formed along the entire optical element bottom surface 7. The single reflector may be formed in a lower portion of the optical element OP. The reflector 13 may be constructed to reflect sunlight under an angle, within a range of 20 to 70, preferably 30 to 60 and most preferably 40 to 55 degrees with respect to the optical axis OA of the optical element to the absorber 10. The reflections may be caused by internal reflections in the optical element. The reflector 13 may have a reflective surface having an angle within a range of 20 to 70, preferably 30 to 60, and most preferably 40 to 55 degrees with respect to the optical axis OA of the optical element to reflect the sunlight to the absorber.

The absorber sheet surrounding the optical element may absorb also the sun light from other surfaces of the optical element besides the sun light reflected from the reflector. In this manner, the back reflection rates are reduced for the sun light that is incident to a lesser extent on the bright circuit boards or light source. The absorber sheet surrounding the optical element may have different geometric contours. The absorber surface may be made from different materials with dark colour and the absorption effect may also be improved by providing the same with different surface features (FIG. 5).

The absorber may be fastened on the inactive surfaces of the optical element with an adhesive 16. The distance between the absorber and the reflectors 12, 13 may be larger than 0, between 0.1 to 50 mm, preferably 0.2 to 10 mm and most preferably between 0.5 and 2.5 mm.

An adhesive 16 may be used to enable the optical element to fasten on the front surface which adhesive may ensure water impermeability of the information system.

In this way, all the guide surfaces of the optical element may be used in an active manner. The light beams incident on a circular and smooth surface are reflected more strongly at their angles of incidence rather than being homogeneously diffused from the surface. This reflection forms also at the different angles through which the observer views, because of the geometric structure of the circular surface.

Figure 6:
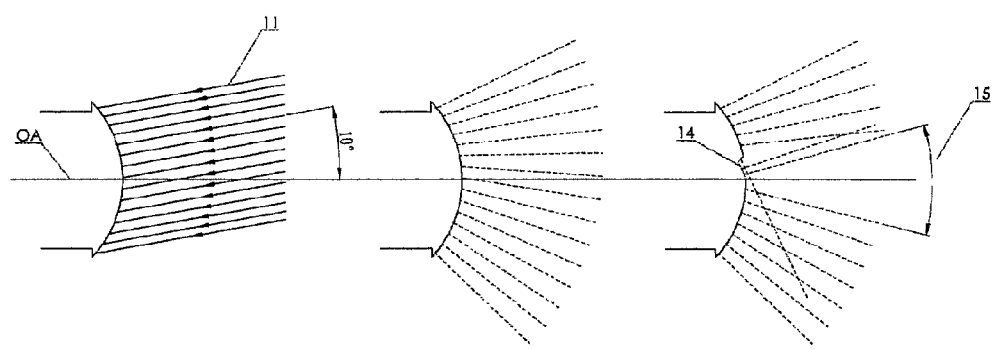
FIG. 6 depicts sunlight incident on a circular surface (a), back reflection from the circular surface (b) and the angle range where the back reflection is reduced (c)
Figure 7:
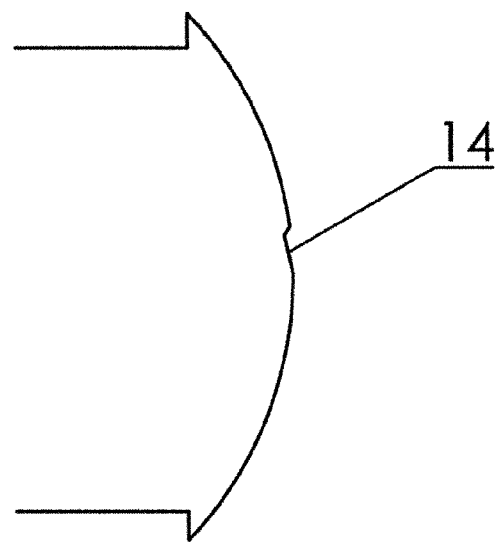
FIG. 7 depicts a side view on the geometric shape reducing the reflection of sunlight; and,
FIG. 8 depicts fastening of the electronic board to the optical element.

In FIG. 6, the manner in which sunlight 11 incident with an angle of 10 degrees with respect the optical axis OA (see FIG. 6a) will be reflected back from a circular surface is illustrated (see FIG. 6b). When a circular surface is viewed perpendicularly, said sunlight reflections appear as linear glare along the surface and they increase the amount of back reflection. As shown in FIG. 7, a geometric shape 14 is formed in order to prevent sun light reflections. The geometric shape 14 reduces within a desired angle range 15 (see FIG. 6c) from the optical axis OA the back reflection of the sun light 11. By means of this shape, the back reflection directions are changed for the sun beams reflecting from the exit surface 6, thereby reducing the amounts of the back reflection within the desired angle range 15. The geometric shape may be formed to not reflect any incoming sunlight in the desired angle range 15 of preferably −10 to +20 degrees with respect to the optical axis OA.

The downward inclination of the geometric shape 14 may minimize the rate of accumulation of snow and dust on a lower portion of the exit surface. Thus, it becomes possible to maintain optical efficiency.

It is required to precisely align the optical elements fastened on the front surface of the variable message system with the light sources and attach the same accordingly, depending on the system desired. Otherwise, the desired optical values may not be achieved due to the light source that is misaligned or that becomes dislocated in time.

Figure 8:
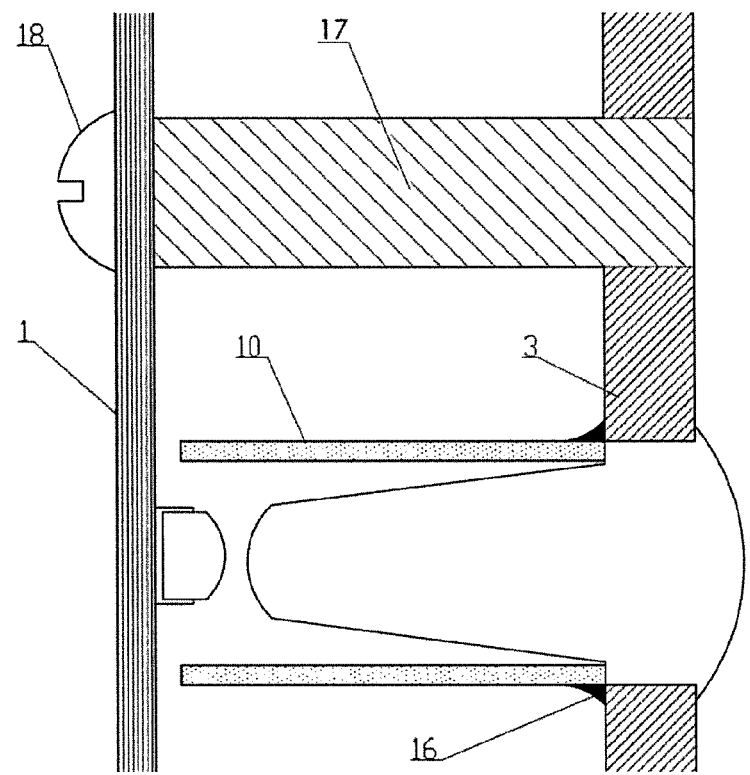

As shown in FIG. 8, the electronic circuit boards 1 to which the light sources are attached are fastened on the front surface with the help of a screw and by means of the metal bushes 17 driven inwards from the front surface 3 of the variable message system. In this way, the light sources are enabled to be precisely secured and aligned with the optical element in three dimensions. Because of the metallic structure of the bushes, a structure with longer lifetime is enabled to form. In addition, contrary to the structures formed by way of screwing to the optical element surface the use of the optical element with smaller size has been made possible. The invention will be produced in appropriate dimensions for variable information systems and used for increasing the contrast without impairing the optical efficiency.

While specific embodiments of the invention have been described above, it will be appreciated that the invention may be practiced otherwise than as described. For example, the front surface where the light source and the lens may be positioned may be painted with dyes having low coefficient of reflection. The amount of reflection generated on the lens surface may be reduced. It may be possible to form shades on the light surface and increase the contrast by means of the extensions to be added on the lens, however, such extensions create an irregular surface on the front surface, thereby causing the accumulation of snow and dust, which may reduce the optical efficiency.

Another method for increasing the contrast may involve the use of the coloured lenses. The lens is produced with the same colour as the colour of radiation to enable the lens to absorb the other colours in the solar chromatic spectrum. However, it may not be possible to employ this method for multi-colour light sources. Moreover, the amount of back reflection generated on the lens surface may be reduced by means of nano (and micro) scale structures to be formed within the material by applying the fine surface treatments. On the other hand, this method is rather expensive, as it requires a very precise treatment.

An anti reflection coating may be provided on the lens surface. Even though sufficient results may be obtained within the calculated wavelength range according to this method, it may not be possible to obtain efficient results for the sun beams with a wide wavelength range. Multi-layer coatings may be applied for the wider wavelength range, but this method then becomes rather costly. Further, the coatings may be influenced by the weather conditions and with time they begin to peel off from the surface of the optical element. For production at low cost, the active contrast may be provided by the geometric changes made on the lens without disturbing the desired angles, radiation and colors.

Description of the reference numbers in the figures are assigned with reference numbers, wherein:
OP: Optical Element
1: Electronic Circuit Board (PCB)
2: Light Source (LED)
3: Front Surface
4: Side Surface
5: Entrance Surface
6: Exit Surface
7: Bottom Surface
8: Surface Engaging the Front Surface
9: Surface Engaging the Front Surface
10: Absorber
11: Sunlight
12: Reflectors
13: Reflector
14: Geometric Shape
15: Angle Range Where the Back Reflection is reduced
16: Adhesive
17: Bush System
18: Screw
OA: Optical Axis
OP: Optical Element

The invention claimed is:

1. An information system for displaying information, the system comprising:
   a light source;
   an optical element comprising one body having an optical axis, an entrance surface, an exit surface, and a side surface located between the entrance surface and the exit surface, to display information by directing light received at the entrance surface from the light source through the optical element to the exit surface for the light to exit the optical element, and
   an absorber to absorb sunlight entering the optical element at the exit surface, wherein the system comprises a reflector to reflect sunlight entering the optical element at the exit surface to the absorber to absorb the reflected sunlight, and
   wherein the reflector is an internal reflector in the optical element to direct the sunlight out of the optical element through the side surface of the optical element by way of total reflection.

2. The information system according to claim 1, wherein the reflector is constructed to reflect sunlight under an angle within a range of 20 to 70 degrees with respect to the optical axis of the optical element to the absorber.

3. The information system according to claim 1, wherein the reflector comprises a repetitive reflector distributed over at least a part of the side surface of the optical element and in which the sunlight entering at the exit surface reflects on the repetitive reflector to the absorber.

4. The information system according to claim 1, wherein the reflector comprises a reflective surface having an angle for total reflection within a range of 20 to 70 degrees with respect to the optical axis of the optical element to reflect the sunlight to the absorber.

5. The information system according to claim 1, wherein the absorber is provided at a distance larger than 0 mm from the reflector.

6. The information system according to claim 1, wherein the exit surface of the optical element has a geometric shape which reduces within a desired angle range the back reflection of the sun light.

7. The information system according to claim 6, wherein the exit surface of the optical element has a tilted upper portion which in use is to shade a relatively lower portion of the exit surface from snow and/or dust.

8. The information system according to claim 1, wherein the exit surface (6) of the optical element comprises a geometric shape which does not reflect any incoming sunlight in a direction with an inclination range of −10 to +20 degrees with respect to the optical axis.

9. The information system according to claim 8, wherein the exit surface of the optical element has a tilted upper portion which in use is to shade a relatively lower portion of the exit surface from snow and/or dust.

10. The information system according claim 1, wherein the reflector is provided to a lower portion of the optical element.

11. The information system according to claim 1, wherein the system comprises:
 a front member with holes for accommodating the optical element;
 a light source mounted on a circuit board and the system comprises a spacer for keeping the circuit board and the front member at a fixed distance.

12. The information system according to claim 11, wherein the electronic circuit board is screwed with a screw to the spacer.

13. The information system according to claim 1, wherein the absorber comprises one or more of the following features: a dark colour paint; and an absorbing structure.

14. The information system according to claim 1, wherein the reflector comprises a single reflector adjacent to the entrance surface of the optical element.

15. A method for displaying information comprising:
 providing light from a light source,
 providing an optical element comprising one body, an entrance surface, an exit surface, and a side surface,
 displaying information by directing light received from the light source at the entrance surface of the optical element through the optical element to the exit surface for the light to exit the optical element, and,
 reflecting sunlight entering the optical element at the exit surface by a reflector to an absorber to absorb the reflected light,
 wherein the reflector is an internal reflector in the optical element to direct the sunlight out of the optical element through the side surface of the optical element by way of total reflection.

16. The information system according to claim 1, wherein the reflector is constructed to reflect sunlight under an angle within a range of 30 to 60 degrees with respect to the optical axis of the optical element to the absorber.

17. The information system according to claim 1, wherein the reflector is constructed to reflect sunlight under an angle within a range of 40 to 55 degrees with respect to the optical axis of the optical element to the absorber.

18. The information system according to claim 1, wherein the reflector comprises a reflective surface having an angle for total reflection within a range of 30 to 60 degrees with respect to the optical axis of the optical element to reflect the sunlight to the absorber.

19. The information system according to claim 1, wherein the reflector comprises a reflective surface having an angle for total reflection within a range of 40 to 55 degrees with respect to the optical axis of the optical element to reflect the sunlight to the absorber.

20. The information system according to claim 1, wherein the absorber is provided at a distance between 0.1 to 50 mm from the reflector.

21. The information system according to claim 1, wherein the absorber is provided at a distance between 0.2 to 10 mm from the reflector.

22. The information system according to claim 1, wherein the absorber is provided at a distance between 0.5 to 2.5 mm from the reflector.

* * * * *